United States Patent
Yamazaki

(10) Patent No.: US 11,701,713 B2
(45) Date of Patent: Jul. 18, 2023

(54) METHOD FOR MANUFACTURING THREE-DIMENSIONAL SHAPED OBJECT WITH REFERENCE OUTER SURFACE LINE WIDTH SMALLER THAN INFILLING TOOLPATH WIDTH

(71) Applicant: SEIKO EPSON CORPORATION, Tokyo (JP)

(72) Inventor: Satoshi Yamazaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 93 days.

(21) Appl. No.: 16/950,989

(22) Filed: Nov. 18, 2020

(65) Prior Publication Data

US 2021/0146609 A1    May 20, 2021

(30) Foreign Application Priority Data

Nov. 20, 2019   (JP) .................................. 2019-209346

(51) Int. Cl.
*B22F 12/53* (2021.01)
*B29C 64/124* (2017.01)
(Continued)

(52) U.S. Cl.
CPC .............. *B22F 12/53* (2021.01); *B22F 10/18* (2021.01); *B22F 10/80* (2021.01); *B29C 64/124* (2017.08);
(Continued)

(58) Field of Classification Search
None
See application file for complete search history.

(56) References Cited

U.S. PATENT DOCUMENTS

2003/0236588 A1* 12/2003 Jang .................. C04B 35/62873
977/839
2018/0071986 A1* 3/2018 Buller .................... B29C 64/386
(Continued)

FOREIGN PATENT DOCUMENTS

JP        2004025843 A   *  1/2004  ........... B29C 64/135
JP        2009-525207 A      7/2009
(Continued)

OTHER PUBLICATIONS

JP 2004/025843 A translation (Year: 2022).*
Additive Manufacturing Textbook NPL.pdf (Year: 2011).*

*Primary Examiner* — Francisco W Tschen
*Assistant Examiner* — Guy F Mongelli
(74) *Attorney, Agent, or Firm* — Global IP Counselors, LLP

(57) ABSTRACT

To provide a method for manufacturing a three-dimensional shaped object in which a three-dimensional shaped object is manufactured by discharging a shaping material from a discharge unit toward a stage to stack a layer, the method for manufacturing a three-dimensional shaped object includes: a first step of generating path data having a plurality of partial paths through which the discharge unit moves while discharging the shaping material; a second step of determining a line width of the shaping material in each of the partial paths and generating line width information for implementing the line width; a third step of generating shaping data including the path data and the line width information; and a fourth step of shaping the three-dimensional shaped object according to the shaping data. In the second step, the line width in a target path that is one of the partial paths is determined in accordance with a distance between a first wall and a second wall separated by the target path. The first wall and the second wall are side edges of the shaping (Continued)

material discharged in the partial path generated before the target path or a contour line of the three-dimensional shaped object.

10 Claims, 10 Drawing Sheets

(51) Int. Cl.
| | |
|---|---|
| *B29C 64/209* | (2017.01) |
| *B29C 64/245* | (2017.01) |
| *B29C 64/227* | (2017.01) |
| *B33Y 50/02* | (2015.01) |
| *B29C 64/393* | (2017.01) |
| *G05B 19/4099* | (2006.01) |
| *G06T 17/00* | (2006.01) |
| *B22F 10/18* | (2021.01) |
| *B22F 10/80* | (2021.01) |
| *B33Y 10/00* | (2015.01) |

(52) U.S. Cl.
CPC .......... *B29C 64/209* (2017.08); *B29C 64/227* (2017.08); *B29C 64/245* (2017.08); *B29C 64/393* (2017.08); *B33Y 50/02* (2014.12); *G05B 19/4099* (2013.01); *G06T 17/00* (2013.01); *B33Y 10/00* (2014.12)

(56) References Cited

U.S. PATENT DOCUMENTS

2018/0264742 A1  9/2018  Yang et al.
2020/0198318 A1* 6/2020  Ford .................... B29C 64/153

FOREIGN PATENT DOCUMENTS

WO    2007/089576 A2    8/2007
WO    2017/094791 A1    6/2017

* cited by examiner

METHOD FOR MANUFACTURING THREE-DIMENSIONAL SHAPED OBJECT WITH REFERENCE OUTER SURFACE LINE WIDTH SMALLER THAN INFILLING TOOLPATH WIDTH

The present application is based on, and claims priority from JP Application Serial Number 2019-209346, filed Nov. 20, 2019, the disclosure of which is hereby incorporated by reference herein in its entirety.

BACKGROUND

1. Technical Field

The present disclosure relates to a method for manufacturing a three-dimensional shaped object and a data processing device.

2. Related Art

Regarding a method for manufacturing a three-dimensional shaped object, for example, JP-A-2009-525207 discloses moving a nozzle for extruding a shaping material according to a building path for building each layer of a three-dimensional shaped object. The building path includes a peripheral path and a bulk cluster path disposed within the peripheral path.

In JP-A-2009-525207, a region that cannot be filled with the bulk cluster path is specified as a gap region, and an additional residual path is generated in the gap region, thereby preventing generation of a gap. However, it is desired to shape a three-dimensional shaped object by preventing generation of the gap region which is a target where the residual path is generated.

SUMMARY

According to an aspect of the present disclosure, a method for manufacturing a three-dimensional shaped object is provided in which a three-dimensional shaped object is manufactured by discharging a shaping material from a discharge unit toward a stage to stack a layer. The method for manufacturing a three-dimensional shaped object includes: a first step of generating path data having a plurality of partial paths each representing a path through which the discharge unit moves while discharging the shaping material; a second step of determining a line width of the shaping material in each of the partial paths and generating line width information for implementing the line width; a third step of generating shaping data including the path data and the line width information; and a fourth step of shaping the three-dimensional shaped object according to the shaping data. In the second step, the line width in a target path that is one of the partial paths is determined in accordance with a distance between a first wall and a second wall separated by the target path. The first wall and the second wall are side edges of the shaping material discharged in the partial path generated before the target path or a contour line of the three-dimensional shaped object.

DESCRIPTION OF EXEMPLARY EMBODIMENTS

A. First Embodiment

Figure 1:
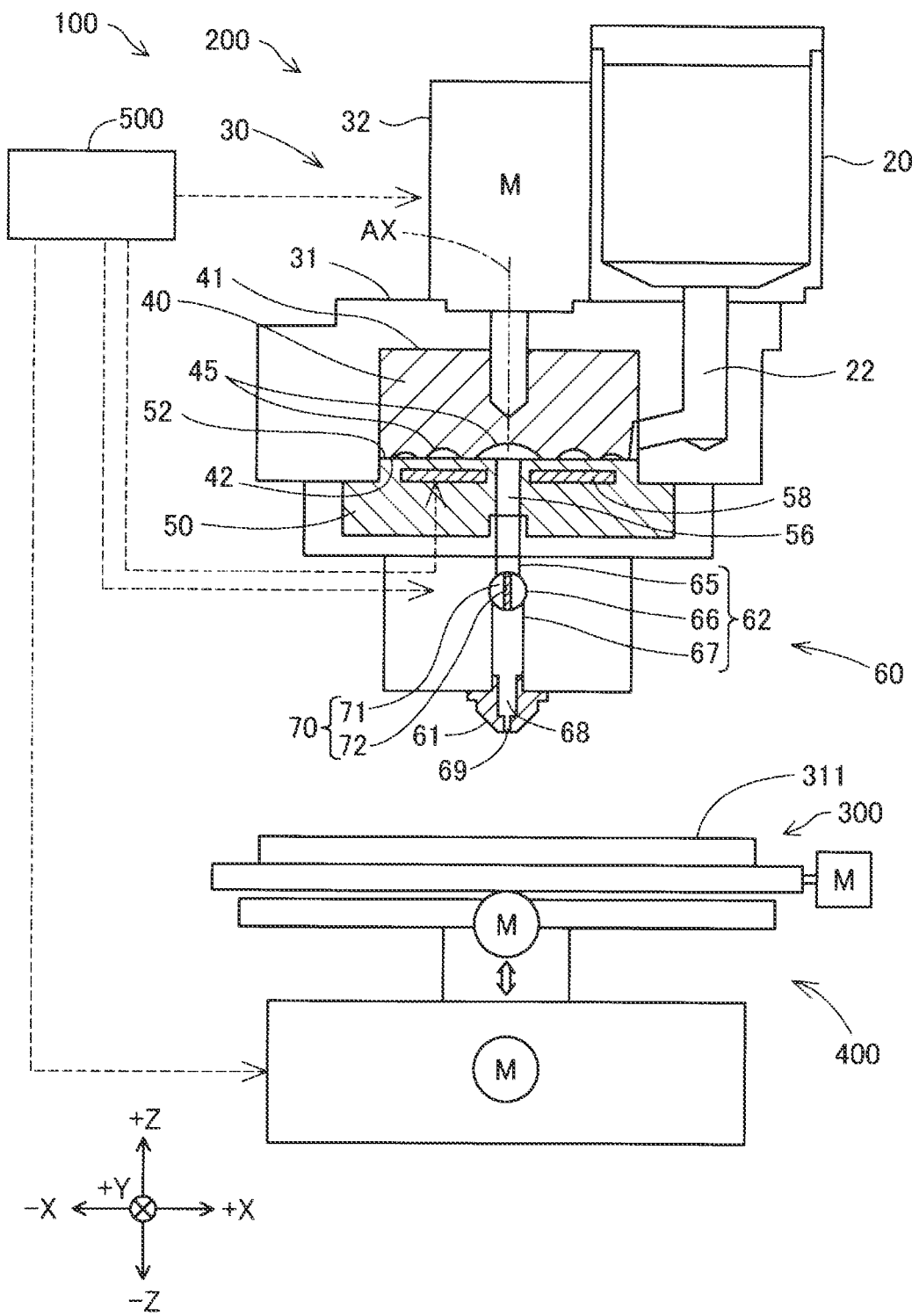
FIG. 1 is a diagram showing a schematic configuration of a three-dimensional shaping device according to a first embodiment.

FIG. 1 is a diagram showing a schematic configuration of a three-dimensional shaping device 100 according to a first embodiment. FIG. 1 shows arrows along X, Y, and Z directions orthogonal to each other. The X direction and the Y direction are directions along a horizontal direction, and the Z direction is a direction along a vertical direction. In other figures, the arrows along the X, Y, and Z directions are appropriately shown. The X, Y, Z directions in FIG. 1 and the X, Y, Z directions in other figures represent the same direction. In the following description, when a direction is specified, "+" indicates a positive direction and "−" indicates a negative direction, and positive and negative symbols are used together to indicate directions.

The three-dimensional shaping device 100 according to the present embodiment includes a shaping unit 200, a stage 300, a moving mechanism 400, and a control unit 500. Under control of the control unit 500, the three-dimensional shaping device 100 drives the moving mechanism 400 to change a relative position between a discharge unit 60 provided in the shaping unit 200 and the stage 300 while discharging a shaping material from the discharge unit 60 toward the stage 300, thereby shaping a three-dimensional shaped object having a desired shape on a shaping surface 311 of the stage 300. The shaping material may be referred to as a molten material. A detailed configuration of the shaping unit 200 will be described later.

The moving mechanism 400 changes a relative position between the discharge unit 60 and the shaping surface 311.

In the present embodiment, the moving mechanism 400 moves the stage 300 relative to the shaping unit 200 to change the relative position between the discharge unit 60 and the shaping surface 311. A change in the relative position of the discharge unit 60 relative to the shaping surface 311 may be referred to as a movement of the discharge unit 60. In the present embodiment, for example, moving the stage 300 in a +X direction can also be rephrased as moving the discharge unit 60 in a −X direction.

The moving mechanism 400 according to the present embodiment is implemented by a three-axis positioner that moves the stage 300 in three axial directions of the X, Y, and Z directions by drive forces of three motors. Each motor is driven under the control of the control unit 500. The moving mechanism 400 may be configured to change the relative position between the discharge unit 60 and the shaping surface 311 by moving the shaping unit 200 without moving the stage 300, instead of moving the stage 300. The moving mechanism 400 may be configured to change the relative position between the discharge unit 60 and the shaping surface 311 by moving both the stage 300 and the shaping unit 200.

The control unit 500 is implemented by a computer including one or more processors, a main storage device, and an input and output interface for inputting and outputting signals to and from the outside. In the present embodiment, the control unit 500 controls operations of the shaping unit 200 and the moving mechanism 400 by the processor executing a program or a command read in the main storage device, so as to execute a shaping processing for shaping the three-dimensional shaped object. The operations include changing a three-dimensional relative position between the shaping unit 200 and the stage 300. The control unit 500 may be implemented by a combination of a plurality of circuits instead of the computer. As will be described later, the control unit 500 also functions as a data processing device that processes data for shaping the three-dimensional shaped object. In other embodiments, a data processing device separate than the control unit 500 may be provided.

The shaping unit 200 includes a material supply unit 20 that is a material supply source, a melting unit 30 for melting a material supplied from the material supply unit 20 into a shaping material, the discharge unit 60 having a nozzle hole 69 for discharging the shaping material supplied from the melting unit 30, and a discharge amount adjustment mechanism 70 for adjusting a flow rate of the shaping material discharged from nozzle hole 69.

A material in a state of pellets, powder, or the like is accommodated in the material supply unit 20. In the present embodiment, a pellet-shaped resin is used as the material. The material supply unit 20 according to the present embodiment is implemented by a hopper. Below the material supply unit 20, a supply path 22 that couples the material supply unit 20 and the melting unit 30 is provided. The material supply unit 20 supplies the material to the melting unit 30 via the supply path 22. Details of the material will be described later.

The melting unit 30 includes a screw case 31, a drive motor 32, a flat screw 40, and a barrel 50. The melting unit 30 melts at least a part of a solid-state material supplied from the material supply unit 20, converts the material into a paste-shaped shaping material having fluidity, and supplies the material to the discharge unit 60. The term "melt" means not only that a material having thermoplasticity is heated to a temperature equal to or higher than a melting point to become a liquid, but also "plasticization", that is, the material having thermoplasticity is softened by being heated to a temperature equal to or higher than a glass transition point to exhibit fluidity thereof.

The screw case 31 is a case for accommodating the flat screw 40. The barrel 50 is fixed to a lower surface of the screw case 31, and the flat screw 40 is accommodated in a space surrounded by the screw case 31 and the barrel 50. The drive motor 32 is fixed to an upper surface of the screw case 31. A rotation shaft of the drive motor 32 is coupled to the flat screw 40 on an upper surface 41 side. The drive motor 32 is driven under the control of the control unit 500.

The flat screw 40 has a substantially columnar shape whose height in a direction along a central axis RX is smaller than a diameter of the flat screw 40. The flat screw 40 is disposed in the screw case 31 such that the central axis RX is parallel to the Z direction. The flat screw 40 rotates around the central axis RX in the screw case 31 due to a torque generated by the drive motor 32. The flat screw 40 includes a groove forming surface 42 at which groove portions 45 are formed on a side opposite to the upper surface 41 in the direction along the central axis RX. A specific configuration of the flat screw 40 on a groove forming surface 42 side will be described later.

The barrel 50 is disposed below the flat screw 40. The barrel 50 includes a screw facing surface 52 that faces the groove forming surface 42 of the flat screw 40. The barrel 50 is provided with a communication hole 56 that communicates with the discharge unit 60 on the central axis RX of the flat screw 40. The barrel 50 is provided with a heater 58 at a position facing the groove portion 45 of the flat screw 40. A temperature of the heater 58 is controlled by the control unit 500. A specific configuration of the barrel 50 on a screw facing surface 52 side will be described later.

The discharge unit 60 is fixed to a lower surface of the barrel 50. The discharge unit 60 includes a supply flow path 62 and a nozzle 61. The supply flow path 62 communicates between the melting unit 30 and the nozzle 61, and supplies the shaping material from the melting unit 30 to the nozzle 61.

The supply flow path 62 has a first supply port 65, an intersecting hole 66, and a second supply port 67. The first supply port 65 and the second supply port 67 extend in the vertical direction. The intersecting hole 66 extends in the horizontal direction intersecting the first supply port 65 and the second supply port 67. An upper end of the first supply port 65 is coupled to the communication hole 56 of the barrel 50, and a lower end of the first supply port 65 is coupled to the intersecting hole 66. An upper end of the second supply port 67 is coupled to the intersecting hole 66, and a lower end of the second supply port 67 is coupled to the nozzle 61. The discharge amount adjustment mechanism 70, which will be described later, is accommodated in the intersecting hole 66. The shaping material supplied from the communication hole 56 of the barrel 50 to the first supply port 65 flows in an order of the intersecting hole 66, the second supply port 67, and the nozzle 61.

The nozzle 61 is provided with a nozzle flow path 68 and the nozzle hole 69. The nozzle flow path 68 is a flow path provided in the nozzle 61. The nozzle flow path 68 is coupled to the second supply port 67. The nozzle hole 69 is a portion in which a flow path cross section provided at an end portion on a side of the nozzle flow path 68 communicating with atmosphere is reduced. The shaping material supplied from the second supply port 67 to the nozzle flow path 68 is discharged from the nozzle hole 69. In the present embodiment, an opening shape of the nozzle hole 69 is a circle. The opening shape of the nozzle hole 69 is not limited to a circle, and may be, for example, a quadrangle or a polygon other than the quadrangle.

The discharge amount adjustment mechanism 70 is provided in the supply flow path 62, and adjusts an amount of the shaping material discharged from the nozzle 61. The amount of the shaping material discharged from the nozzle 61 per unit time may be referred to as a discharge amount. The discharge amount adjustment mechanism 70 in the present embodiment is implemented by a butterfly valve. The discharge amount adjustment mechanism 70 includes a drive shaft 71 that is a shaft-shaped member, and a plate-shaped valve body 72 that rotates in accordance with a rotation of the drive shaft 71. The drive shaft 71 is inserted into the intersecting hole 66 in a manner that the direction along a central axis of the drive shaft 71 intersects a direction in which the shaping material flows in the supply flow path 62.

The discharge amount adjustment mechanism 70 functions as a flow rate adjustment mechanism for adjusting the flow rate of the shaping material flowing in the supply flow path 62. Specifically, the discharge amount adjustment mechanism 70 adjusts the flow rate of the shaping material flowing in the supply flow path 62 by changing a rotation angle of the valve body 72. The discharge amount is adjusted by adjusting the flow rate of the shaping material flowing in the supply flow path 62. Increasing the discharge amount by controlling the discharge amount adjustment mechanism 70 may be referred to as opening the discharge amount adjustment mechanism 70. Decreasing the discharge amount by controlling the discharge amount adjustment mechanism 70 may be referred to as closing the discharge amount adjustment mechanism 70. A rotation degree of the valve body 72 may be referred to as an opening degree. When a plate-shaped surface of the valve body 72 is perpendicular to the direction in which the shaping material flows in the supply flow path 62 by the rotation of the drive shaft 71, the opening degree is 0, the melting unit 30 and the nozzle 61 do not communicate with each other, and a discharge of the shaping material from the nozzle 61 is stopped. When the plate-shaped surface of the valve body 72 is parallel to the direction in which the shaping material flows in the supply flow path 62, the opening degree is 100, the melting unit 30 and the nozzle 61 communicate with each other, and the shaping material is discharged. Thus, the discharge amount adjustment mechanism 70 also controls a discharge start and a discharge stop of the shaping material from the nozzle 61.

Figure 2:
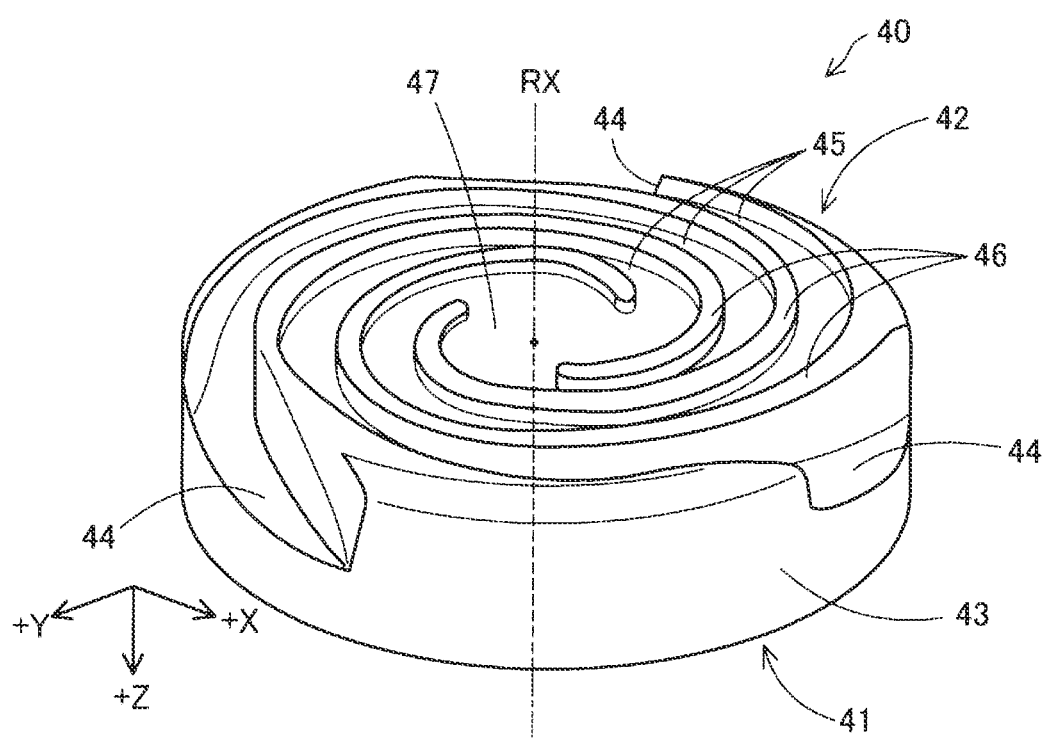
FIG. 2 is a schematic perspective view showing a configuration of a flat screw on a groove forming surface side.

FIG. 2 is a schematic perspective view showing the configuration of the flat screw 40 on the groove forming surface 42 side. In FIG. 2, a position of the central axis RX of the flat screw 40 is shown by a dashed line. As described with reference to FIG. 1, the groove portions 45 are provided in the groove forming surface 42.

A central portion 47 of the groove forming surface 42 of the flat screw 40 is implemented as a recess to which one end of the groove portion 45 is coupled. The central portion 47 faces the communication hole 56 of the barrel 50 shown in FIG. 1. The central portion 47 intersects the central axis RX.

The groove portion 45 of the flat screw 40 forms a so-called scroll groove. The groove portion 45 extends spirally from the central portion 47 toward an outer periphery of the flat screw 40 so as to draw an arc. The groove portion 45 may extend spirally. The groove forming surface 42 is provided with ridge portions 46 that form side wall portions of the groove portions 45 and extend along the groove portions 45.

The groove portion 45 is continuous to a material introduction port 44 formed in a side surface 43 of the flat screw 40. The material introduction port 44 is a portion that receives the material supplied via the supply path 22 of the material supply unit 20.

FIG. 2 shows an example of the flat screw 40 including three groove portions 45 and three ridge portions 46. The number of the groove portion 45 or the ridge portion 46 provided on the flat screw 40 is not limited to three. The flat screw 40 may be provided with only one groove portion 45, or may be provided with two or more groove portions 45. Any number of the ridge portions 46 may be provided in accordance with the number of the groove portions 45.

FIG. 2 illustrates an example of the flat screw 40 in which the material introduction port 44 is formed at three places. The number of the material introduction port 44 provided in the flat screw 40 is not limited to three. In the flat screw 40, the material introduction port 44 may be provided at only one place, or may be provided at two or more places.

Figure 3:
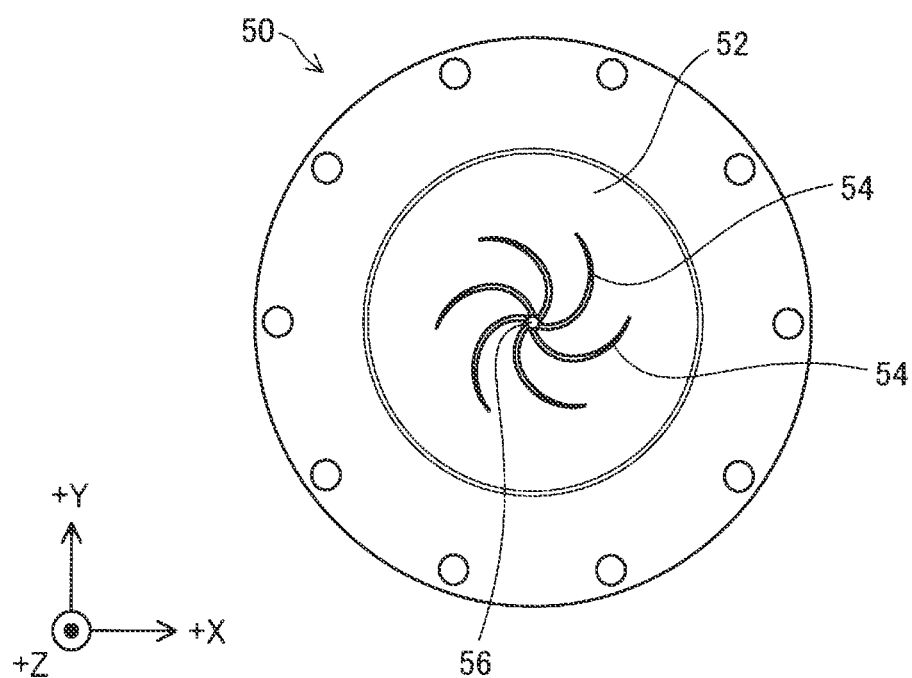
FIG. 3 is a top view showing a configuration of a barrel on a screw facing surface side.

FIG. 3 is a top view showing the configuration of the barrel 50 on the screw facing surface 52 side. As described above, the communication hole 56 that communicates with the discharge unit 60 is formed at a center of the screw facing surface 52. A plurality of guide grooves 54 are formed around the communication hole 56 in the screw facing surface 52. One end of the guide groove 54 is coupled to the communication hole 56, and extends spirally from the communication hole 56 toward an outer periphery of the screw facing surface 52. The guide groove 54 has a function of guiding the shaping material to the communication hole 56.

Figure 4:
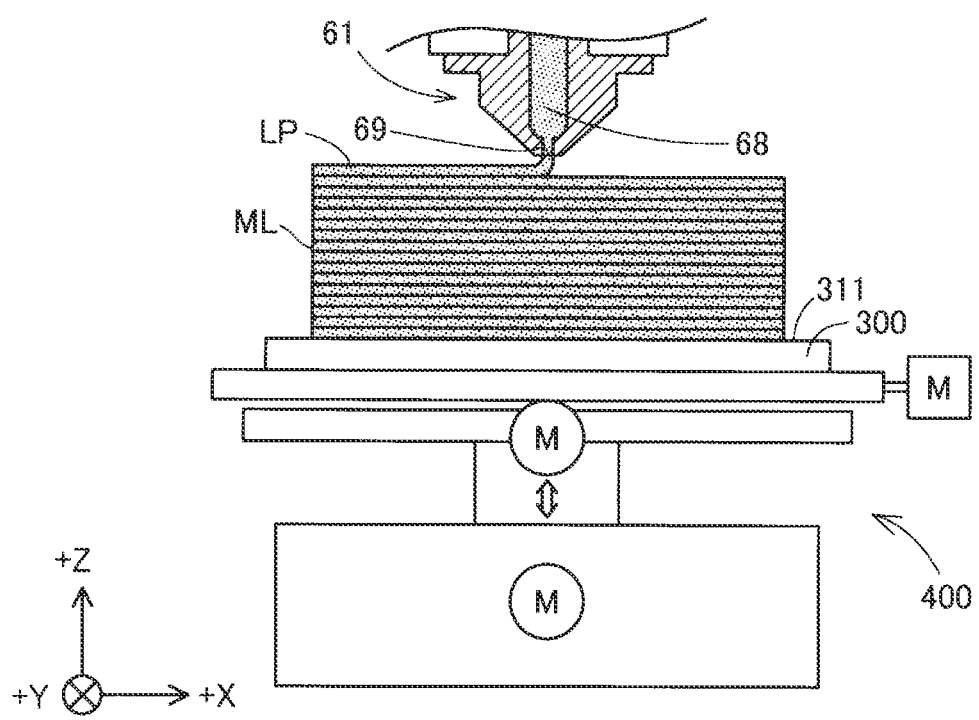
FIG. 4 is a schematic diagram schematically showing a state where a three-dimensional shaped object is shaped.

FIG. 4 is a schematic diagram schematically showing a state where a three-dimensional shaped object is shaped in the three-dimensional shaping device 100. In the three-dimensional shaping device 100, as described above, the melting unit 30 melts the material in a solid state supplied to the groove portion 45 of the rotating flat screw 40, so as to generate the shaping material. While moving the discharge unit 60, the control unit 500 causes the shaping material to be discharged from the discharge unit 60 toward the shaping surface 311. Specifically, while maintaining a distance between the shaping surface 311 and the nozzle 61, the control unit 500 causes the shaping material to be discharged from the nozzle 61 while moving the nozzle 61 in a direction along the shaping surface 311. The shaping material discharged from the nozzle 61 is continuously stacked in a moving direction of the nozzle 61. Accordingly, a linear portion LP that is a shaping portion extending linearly along a moving path of the nozzle 61 is formed. The movement of the discharge unit 60 while discharging the shaping material may be referred to as scanning. A direction of scanning of the discharge unit 60 may be referred to as a scanning direction.

The control unit 500 repeats the scanning with the nozzle 61 to form layers MLs. After forming one layer ML, the control unit 500 moves the nozzle 61 in the Z direction. Thereafter, the three-dimensional shaped object is shaped by further stacking layers MLs on the layer ML previously formed.

Figure 5:
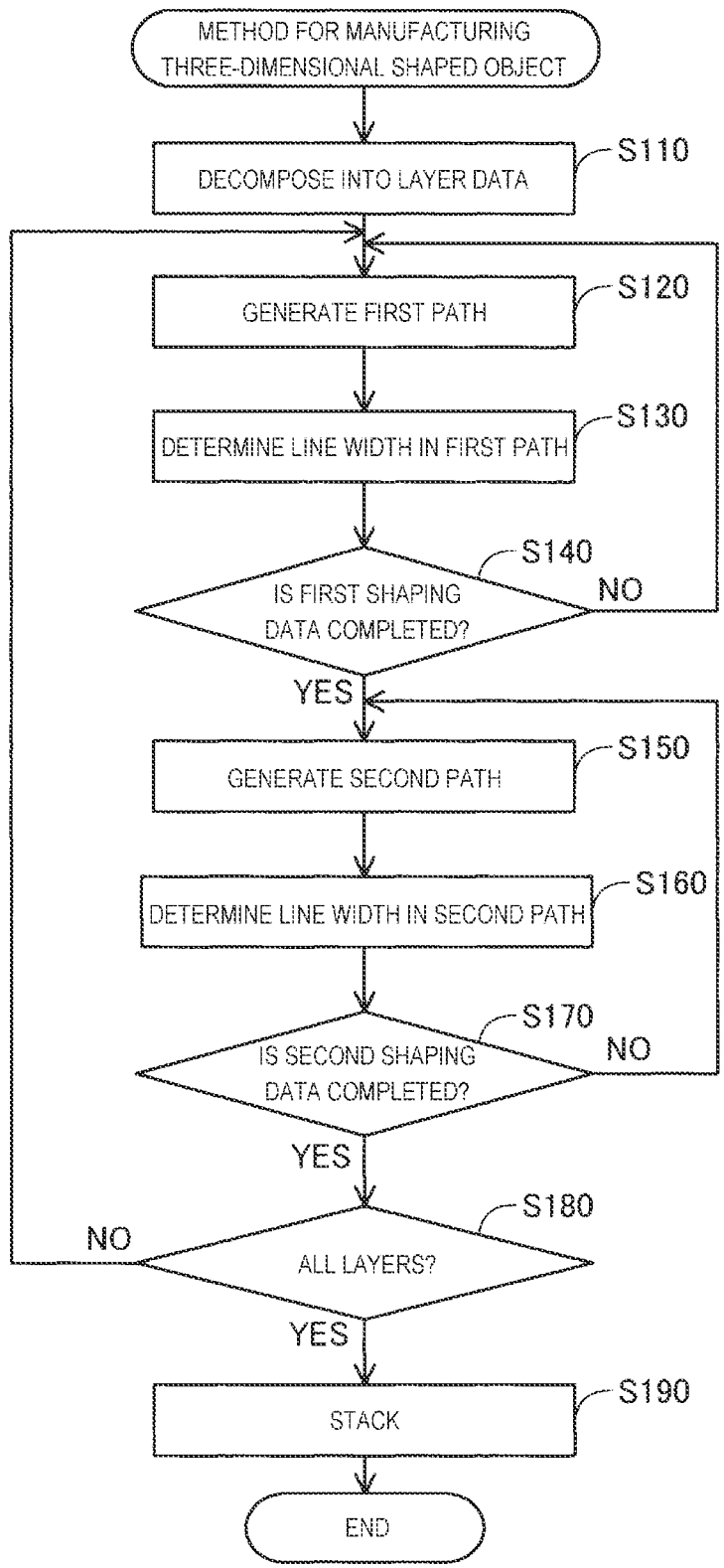
FIG. 5 is a process diagram showing a manufacturing process of the three-dimensional shaped object according to the first embodiment.

FIG. 5 is a process diagram showing a manufacturing process of the three-dimensional shaped object according to the present embodiment. When a predetermined start operation is performed by a user on an operation panel provided on the three-dimensional shaping device 100 or a computer coupled to the three-dimensional shaping device 100, the shaping processing is executed by the control unit 500. By executing the shaping processing, the three-dimensional shaping device 100 starts manufacturing the three-dimensional shaped object.

Figure 6:
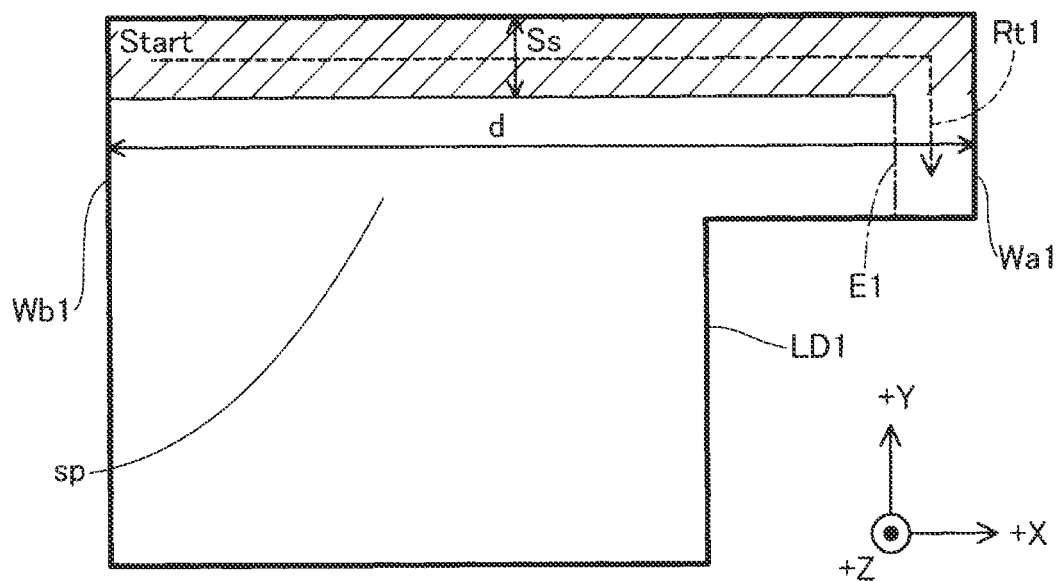
FIG. 6 is a diagram showing an example of a plane shape of one layer of the three-dimensional shaped object according to the first embodiment.
Figure 9:
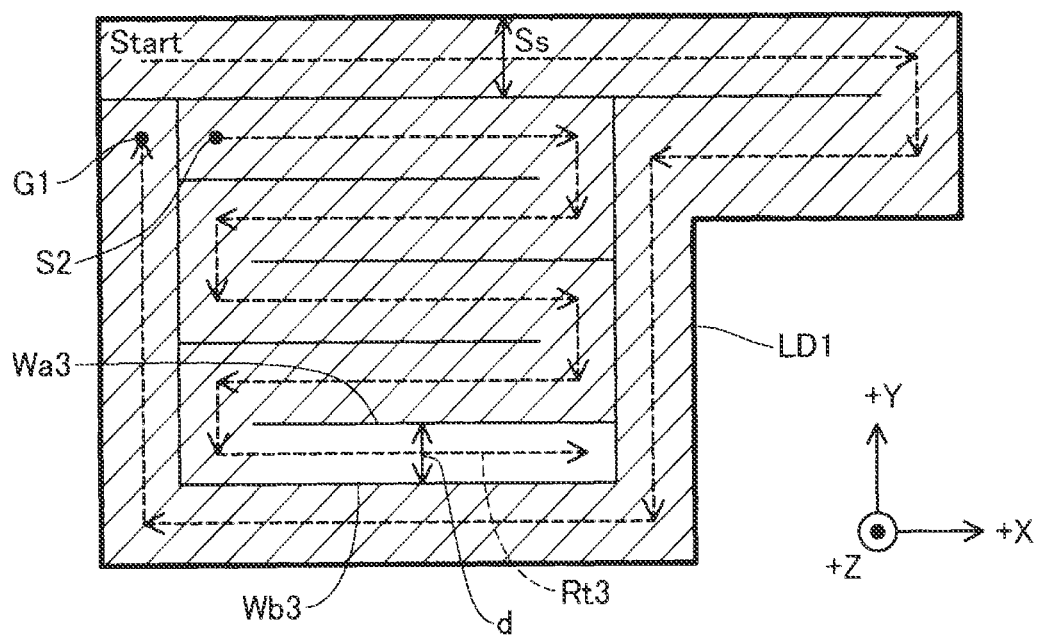
FIG. 9 is a diagram showing an example of a plane shape of one layer of the three-dimensional shaped object according to the first embodiment.

In the shaping processing, the control unit 500 appropriately controls the shaping unit 200 and the moving mechanism 400 according to shaping data to stack layers of the shaping material on the shaping surface 311, thereby shaping the three-dimensional shaped object. FIGS. 6 and 9 are diagrams showing examples of a plane shape of one layer of the three-dimensional shaped object. Details of the shaping data will be described below.

In step S110, the control unit 500 analyzes three-dimensional CAD data that is the shaping data of the three-dimensional shaped object input from the outside, and generates layer data obtained by slicing the three-dimensional shaped object into a plurality of layers along an XY plane. The layer data is data representing a contour line of the three-dimensional shaped object in the XY plane. In FIGS. 6 to 9, an example in which the contour line of the three-dimensional shaped object having a portion protruding outward is represented by layer data LD1 is indicated by a thick line.

In step S120, the control unit 500 generates a first path that is a partial path. The partial path refers to a path through which the discharge unit 60 moves while discharging the shaping material. The first path refers to a partial path that forms an outer shell shape of the three-dimensional shaped object among partial paths. The outer shell shape is a portion of the three-dimensional shaped object that is in contact with the contour line. Each partial path is a linear path. In the present embodiment, the control unit 500 repeatedly executes the processing of step S120 in accordance with the processing of step S190 to be described later to generate path data having a plurality of partial paths. That is, by repeatedly executing the processing of step S120, first path data having a plurality of first partial paths is generated. A step of generating the path data may be referred to as a first step.

In step S130, the control unit 500 determines a line width in the first path. The line width refers to a width of the shaping material discharged onto the shaping surface 311 in an intersecting direction intersecting the scanning direction. In the present embodiment, the control unit 500 generates first line width information in step S130. Line width information is information for discharging the shaping material having the determined line width in each partial path. That is, the line width information is information for implementing the determined line width. In the present embodiment, the line width information includes discharge amount information or moving speed information. The discharge amount information is information indicating a discharge amount of the shaping material in each partial path. The moving speed information is information indicating a moving speed at which the discharge unit 60 moves while discharging the shaping material in each partial path. The first line width information refers to the line width information in the first path. A step of determining the line width in each partial path and generating the line width information for implementing the determined line width may be referred to as a second step. Details of the line width and the line width information will be described later.

The control unit 500 repeats the processing of step S130 in accordance with the processing of step S140 to be described later to determine the line width in each of first paths generated in step S120. In the present embodiment, the first line width information in each first path is also generated by repeating the processing of step S130.

In the present embodiment, the control unit 500 repeats the processing of step S120 and the processing of step S130 to generate first shaping data. The shaping data is data including the path data and the line width information. The first shaping data is data including the first path data and the first line width information. A step of generating the shaping data may be referred to as a third step.

In step S140, the control unit 500 determines whether the first shaping data is completed. The expression "the first shaping data is completed" refers to a state where the first path data for forming the outer shell shape of the three-dimensional shaped object is generated, and by generating the first line width information in each first path included in the first path data, data for forming the outer shell shape is generated. When the control unit 500 determines that the first shaping data is not completed, the processing returns to step S120 to generate a next first path.

When it is determined in step S140 that the first shaping data is completed, in step S150, the control unit 500 generates a second path. The second path refers to a partial path that fills an infill region that is an inner side portion of the outer shell shape.

In step S160, the control unit 500 determines the line width in the second path. In the present embodiment, the control unit 500 generates second line width information in step S160. The second line width information refers to the line width information in the second path among the line width information.

In step S170, the control unit 500 determines whether second shaping data is completed. The second shaping data is data including second path data and the second line width information. The expression "second shaping data is completed" refers to a state where the second path data for filling the infill region is generated, and by generating the second line width information in each second path included in the second path data, data for forming the infill region of the three-dimensional shaped object is generated. When the control unit 500 determines that the second shaping data is not completed, the processing returns to step S150 to generate a next second path.

When it is determined in step S170 that the second shaping data is completed, in step S180, the control unit 500 determines whether the shaping data for all layers is completed. When the control unit 500 determines that the shaping data for all the layers is not completed, the processing returns to step S120 to generate the first path in the next layer ML. That is, by the processing from step S120 to step S170, the control unit 500 generates the shaping data for shaping one layer ML of the three-dimensional shaped object. The control unit 500 repeats the processing from step S120 to step S170 in accordance with the processing of step S180 to complete the shaping data for all the layers.

When it is determined in step S180 that the shaping data for all the layers is completed, in step S190, the control unit 500 causes the shaping material to be discharged from the discharge unit 60 according to the completed shaping data and stacks the layer ML of the discharged shaping material on the shaping surface 311, thereby shaping the three-dimensional shaped object. A step of shaping the three-dimensional shaped object according to the shaping data may be referred to as a fourth step.

In the present embodiment, by controlling the shaping unit 200 and the moving mechanism 400, the control unit 500 can change the line width of the shaping material discharged from the discharge unit 60 between a minimum line width Smin and a maximum line width Smax. When the line width is not changed, the control unit 500 controls the shaping unit 200 and the moving mechanism such that the line width is a reference line width Ss.

In the present embodiment, when the line width is changed, the control unit 500 changes the discharge amount of the shaping material or the moving speed of the discharge unit 60 which is the line width information, or both. An amount of the shaping material discharged onto the shaping surface 311 per unit movement amount of the discharge unit 60 changes and the line width changes due to the change in the discharge amount and the moving speed. For example, the control unit 500 can determine the line width information for implementing a desired line width by calculating a discharge amount and a moving speed for discharging the shaping material with a desired line width in the partial path.

In the present embodiment, the reference line width Ss is a value of 60% of the maximum line width Smax. The reference line width Ss and the minimum line width Smin are different values. The maximum line width Smax is a value larger than a sum of the reference line width Ss and the minimum line width Smin. In another embodiment, the reference line width Ss is preferably 30% or more and 60% or less of the maximum line width Smax. In general, by reducing a ratio of the reference line width Ss to the maximum line width Smax, shaping accuracy of the three-dimensional shaped object is improved, but a shaping time required for the shaping increases. Conversely, by increasing the ratio of the reference line width Ss to the maximum line width Smax, the shaping time is shortened, but the shaping accuracy decreases. By setting the reference line width Ss to 30% or more and 60% or less of the maximum line width Smax, it is possible to shape the three-dimensional shaped object while maintaining a balance between the shaping accuracy and the shaping time.

Figure 7:
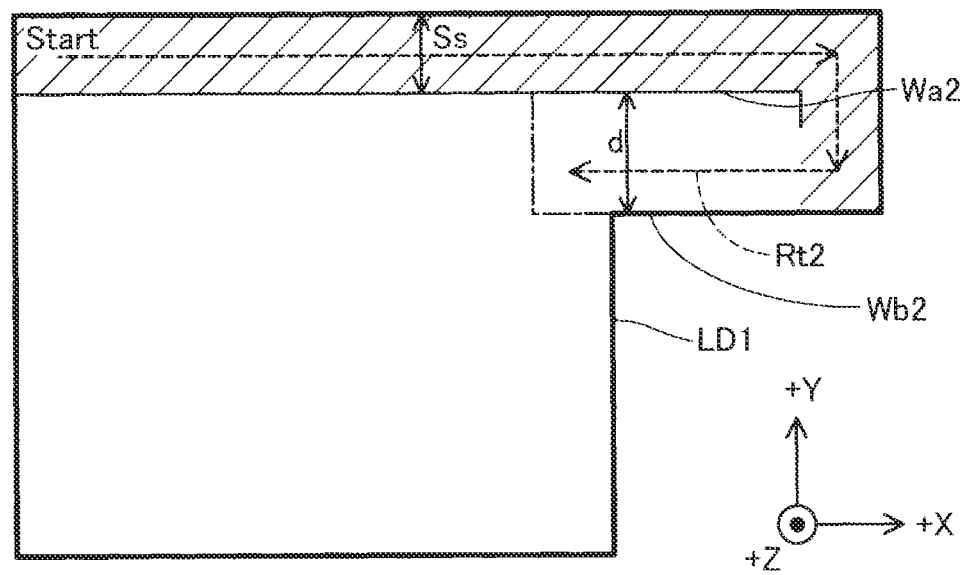
FIG. 7 is a diagram showing an example of a plane shape of one layer of the three-dimensional shaped object according to the first embodiment.
Figure 8:
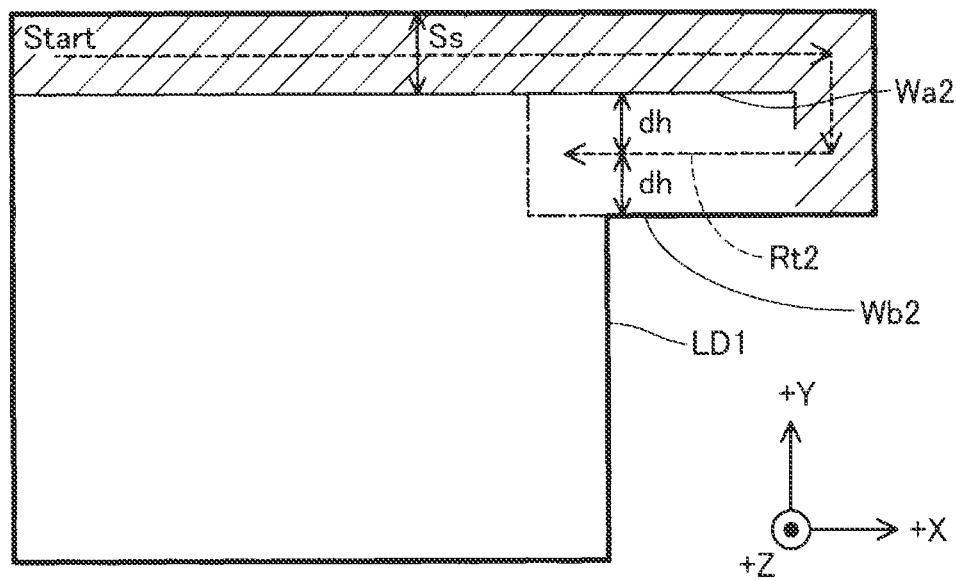
FIG. 8 is a diagram showing an example of a plane shape of one layer of the three-dimensional shaped object according to the first embodiment.

Hereinafter, the method for manufacturing a three-dimensional shaped object described above will be described in detail with reference to FIGS. 6 to 9. FIG. 6 shows a trajectory of the shaping material when it is assumed that the control unit 500 causes the shaping material to be discharged from the discharge unit 60 according to the first shaping data generated halfway. In a state shown in FIG. 6, the control unit 500 is determining the line width in a target path Rt1 which is one of the first paths. Specifically, the target path Rt1 is the second first path. In FIGS. 6 to 8, the partial paths generated by the control unit 500 are indicated by broken lines. Further, the trajectory of the shaping material discharged in each partial path is hatched.

In the state shown in FIG. 6, the control unit 500 determines the line width in the target path Rt1 in accordance with a distance d between a first wall Wa1 and a second wall Wb1 separated by the target path Rt1. The first wall Wa1 and the second wall Wb1 are side edges of the shaping material discharged in the partial path generated before the target path Rt1 or a contour line of the three-dimensional shaped object. In the state shown in FIG. 6, the first wall Wa1 and the second wall Wb1, as the contour line, are separated by the target path Rt1 extending in a −Y direction. In the state shown in FIG. 6, the control unit 500 determines the first line width information in the target path Rt1 by using, as the distance d, the distance between the first wall Wa1 and the second wall Wb1, as the contour line, in the X direction. In the state shown in FIG. 6, the first wall Wa1 is a contour line positioned in the +X direction when viewed from the target path Rt1, and the second wall Wb1 is a contour line positioned in the −X direction when viewed from the target path Rt1, but a relationship between the first wall Wa1 and the second wall Wb1 may be reversed.

In the state shown in FIG. 6, the distance d is larger than the sum of the reference line width Ss and the minimum line width Smin. That is, the distance d satisfies the following Expression (1).

$$d > Ss + Smin \quad (1)$$

When the Expression (1) is satisfied, the control unit 500 determines the reference line width Ss as the line width in the target path Rt1. That is, in the fourth step, it is assumed that the discharge unit 60 moves along the target path Rt1 while discharging the shaping material having the reference line width Ss. Therefore, a space sp having a distance larger than the minimum line width Smin in the intersecting direction is formed between an end portion E1 of the three-dimensional shaped object to be discharged in the target path Rt1 and the second wall Wb1. Accordingly, the control unit 500 can generate a partial path for filling the space sp in the subsequent steps.

Similar to FIG. 6, FIG. 7 shows a trajectory of the shaping material when it is assumed that the control unit 500 causes the shaping material to be discharged from the discharge unit 60 according to the first shaping data generated halfway. In a state shown in FIG. 7, the control unit 500 is determining the line width in a target path Rt2. Specifically, the target path Rt2 is the third first path.

In the state shown in FIG. 7, the control unit 500 determines the line width in the target path Rt2 in accordance with a distance d between a first wall Wa2 and a second wall Wb2 separated by the target path Rt2. In the state shown in FIG. 7, the first wall Wa2, which is a side edge of the shaping material discharged in the partial path generated before the target path Rt2, and the second wall Wb2, which is an outer shell of the three-dimensional shaped object, are separated by the target path Rt2 extending in the −X direction. That is, in the state shown in FIG. 7, the control unit 500 determines the line width in the target path Rt2 by using, as the distance d, the distance between the first wall Wa2 which is an end portion and the second wall Wb2 which is the outer shell in the Y direction. A relationship between the first wall Wa2 and the second wall Wb2 may be reversed.

In the state shown in FIG. 7, the distance d is larger than the reference line width Ss and equal to or less than the sum of the reference line width Ss and the minimum line width Smin. That is, the distance d satisfies the following Expression (2).

$$Ss < d \leq Ss + Smin \quad (2)$$

When the Expression (2) is satisfied, the control unit 500 determines the line width in the target path Rt2 to a value larger than the reference line width Ss and equal to or less than the distance d. Further, in the present embodiment, the line width in the target path Rt2 is determined to be equal to the distance d. When the line width is thus determined, a gap generated between the shaping material discharged in the target path Rt2 and the first wall Wa2 and the second wall Wb2 is smaller than that in the case where the line width remains the reference line width Ss. In particular, when the line width is determined to be equal to the distance d, the shaping material in the target path Rt2 is discharged so as to be in contact with the first wall Wa2 and the second wall Wb2.

FIG. 8 illustrates a state where the target path Rt2 is changed based on the line width in the target path Rt2 determined in FIG. 7. Specifically, the control unit 500 changes the target path Rt2 so as to pass through, in the intersecting direction, a center of the shaping material discharged from the discharge unit 60 in the target path Rt2. That is, a distance in the intersecting direction between the target path Rt2 and the first wall Wa2 and a distance in the intersecting direction between the target path Rt2 and the second wall Wb2 are both dh, which is half the distance d.

FIG. 9 shows a trajectory of the shaping material when it is assumed that the control unit 500 causes the shaping material to be discharged from the discharge unit 60 according to the second shaping data generated halfway. In a state shown in FIG. 9, the control unit 500 is determining the line width in a target path Rt3 which is one of the second paths. Specifically, the target path Rt3 is the ninth second path.

FIG. 9 shows an end point G1 of the first path data and a start point S2 of the second path data. Specifically, the end point G1 is an end of the last first path included in the first path data, and the start point S2 is a start of the first second path included in the second path data. In FIG. 9, the end point G1 and the start point S2 are shown at different positions, but this is for the convenience of illustration, and in actuality, the two points are at the same position. Therefore, in the present embodiment, the control unit 500 generates the first path data and the second path data by causing the first path and the second path to be continuous.

In the state shown in FIG. 9, the control unit 500 determines the line width in the target path Rt3 in accordance with a distance d between a first wall Wa3 and a second wall Wb3 separated by the target path Rt3. In the state shown in FIG. 9, the first wall Wa3 and the second wall Wb3, which are side edges of the shaping material discharged in the partial path generated before the target path Rt3, are separated by the target path Rt3 extending in the +X direction. That is, in the state shown in FIG. 9, the control unit 500 determines the line width in the target path Rt3 by using, as the distance d, the distance between the first wall Wa3 and the second wall Wb3 which are the side edges in the Y direction. A relationship between the first wall Wa3 and the second wall Wb3 may be reversed.

In the state shown in FIG. 9, the distance d is larger than the minimum line width Smin and equal to or less than the reference line width Ss. That is, the distance d satisfies the following Expression (3).

$$Smin < d \leq Ss \tag{3}$$

When the Expression (3) is satisfied, the control unit 500 determines the line width in the target path Rt3 to a value equal to or less than the reference line width Ss. Further, in the present embodiment, the line width in the target path Rt3 is determined to be equal to the distance d. When the line width is thus determined, it is possible to prevent the shaping material discharged in the target path Rt3 from overlapping the first wall Wa3 and the second wall Wb3. In particular, when the line width is determined to be equal to the distance d, the shaping material in the target path Rt3 is discharged so as to be in contact with the first wall Wa3 and the second wall Wb3.

In the state shown in FIG. 9, similar to FIG. 8, the target path Rt3 is changed so as to pass through, in the intersecting direction, the center of the shaping material discharged from the discharge unit 60 in the target path Rt3.

According to the method for manufacturing a three-dimensional shaped object of the present embodiment described above, the first step of generating the path data having a plurality of partial paths, the second step of determining the line width in each partial path and generating the line width information for implementing the determined line width, the third step of generating the shaping data including the path data and the line width information, and the fourth step of shaping the three-dimensional shaped object according to the shaping data are included. In the second step, the line width in the target path is determined in accordance with the distance d between the first wall and the second wall separated by the target path that is one of the partial paths. Therefore, it is possible to prevent the generation of the gap between the partial paths or between the partial path and the outer shell when generating the shaping data.

In the present embodiment, the line width information includes the discharge amount information in each partial path, or the moving speed information of the discharge unit 60 in each partial path. Therefore, by controlling the discharge amount and the moving speed of the discharge unit 60 in each partial path in accordance with the line width information, the shaping material having the line width determined in the second step can be discharged in each partial path.

In the present embodiment, in the second step, when the Expression (1) is satisfied, the reference line width Ss is determined as the line width in the partial path. Accordingly, the line width is determined so as to leave the space sp having a width equal to or larger than the minimum line width Smin. Therefore, it is possible to generate a path after filling the space sp, so that it is possible to prevent the generation of the gap when generating the shaping data.

In the present embodiment, in the second step, when the Expression (2) is satisfied, the line width in the partial path is determined to be larger than the reference line width Ss and equal to or less than the distance d. Accordingly, it is possible to prevent the generation of the gap when generating the shaping data.

In the present embodiment, in the second step, when the Expression (2) is satisfied, the line width in the partial path is determined to be equal to the distance d. Accordingly, since the shaping material in the partial path is discharged so as to be in contact with the first wall and the second wall, it is possible to more effectively prevent the generation of the gap when generating the shaping data.

In the present embodiment, in the second step, when the Expression (3) is satisfied, the line width in the partial path is determined to be smaller than the reference line width Ss. Accordingly, it is possible to prevent the shaping material discharged in the partial path from overlapping the first wall and the second wall while preventing the generation of the gap when generating the shaping data.

In the present embodiment, in the second step, when the Expression (3) is satisfied, the line width in the partial path is determined to be equal to the distance d. Accordingly, since the shaping material in the partial path is discharged so as to be in contact with the first wall and the second wall, it is possible to more effectively prevent the generation of the gap when generating the shaping data.

In the present embodiment, the partial path is changed, based on the determined line width, so as to pass through the center of the shaping material discharged from the discharge unit 60 in the partial path. Accordingly, the control unit 500 can prevent the generation of the gap in the fourth step by uniformly discharging the shaping material in the intersecting direction when shaping the three-dimensional shaped object according to the shaping data in the fourth step. Therefore, it is possible to prevent the generation of the gap in actual shaping with a simple configuration.

In the present embodiment, the reference line width Ss is set to 30% or more and 60% or less of the maximum line width Smax. Therefore, the balance between the shaping accuracy and the shaping time can be maintained, and the three-dimensional shaped object can be shaped efficiently and accurately.

In the present embodiment, the first step includes generating the first path data having a plurality of first paths that form the outer shell shape, and generating, after generating the first path data, the second path data having a plurality of second paths that fill the infill region that is the inner side portion of the outer shell shape. In the second step, the line width in the first path is determined and the first line width information is generated, and then the second line width in the second path is determined and the second line width information is generated. In the third step, the first shaping data including the first path data and the first line width information is generated, and then the second shaping data including the second path data and the second line width information is generated. Accordingly, the first shaping data for forming the outer shell shape that is easily visible from the outside is generated before the second shaping data. Therefore, it is possible to improve the shaping accuracy of the outer shell shape of the three-dimensional shaped object with simple control.

In the present embodiment, in the first step, the first path data and the second path data are generated by causing the first path and the second path to be continuous. Therefore, it is possible to efficiently shape the three-dimensional shaped object.

Here, a material of the three-dimensional shaped object for use in the three-dimensional shaping device 100 described above will be described. The three-dimensional shaping device 100 can use various materials such as a material having thermoplasticity, a metal material, and a ceramic material as a main material to shape the three-dimensional shaped object. Here, the "main material" means a central material for forming a shape of the three-dimensional shaped object, and a material occupying a content of 50% by weight or more in the three-dimensional shaped object. The above shaping materials include those in which main materials are melted alone, and those in which some of the contained components are melted together with the main materials to form a paste.

When the material having thermoplasticity is used as the main material, the shaping material is generated by plasticizing the material in the melting unit 30.

For example, the following thermoplastic resin materials can be used as the material having thermoplasticity.

Example of Thermoplastic Resin Material

General-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polyetheretherketone (PEEK), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyetherimide, and polyetheretherketone An additive such as a wax, a flame retardant, an antioxidant, and a heat stabilizer in addition to a pigment, a metal, and a ceramic may be mixed to the material having thermoplasticity. The material having thermoplasticity is plasticized by the rotation of the flat screw 40 and the heating of the heater 58 and is then converted into a melted state in the melting unit 30. After the shaping material generated by melting the material having thermoplasticity is discharged from the nozzle 61, the shaping material is cured due to a reduction in temperature.

It is desirable that the material having thermoplasticity is injected from the nozzle 61 in which the material is heated to a temperature equal to or higher than a glass transition point thereof and is then in a completely melted state. For example, when an ABS resin is used, it is desirable that the temperature of the material having thermoplasticity is about 200° C. when discharged from the nozzle 61.

The following metal material, for example, may be used as the main material in the three-dimensional shaping device 100 instead of the above material having thermoplasticity. In this case, it is desirable that a component to be melted at the time of generating the shaping material is mixed with a powder material obtained by converting the following metal material into powder, and then the mixture is charged into the melting unit 30 as a material MR.

Example of Metal Material

A single metal of magnesium (Mg), iron (Fe), cobalt (Co) or chromium (Cr), aluminum (Al), titanium (Ti), copper (Cu), and nickel (Ni), or an alloy containing one or more of these metals Example of Alloy Maraging steel, stainless steel, cobalt chrome molybdenum, titanium alloy, nickel alloy, aluminum alloy, cobalt alloy, and cobalt chromium alloy A ceramic material may be used as the main material in the three-dimensional shaping device 100 instead of the above metal material. As the ceramic material, for example, oxide ceramics such as silicon dioxide, titanium dioxide, aluminum oxide, and zirconium oxide, and non-oxide ceramics such as aluminum nitride can be used. When a metal material or a ceramic material as described above is used as the main material, the shaping material discharged onto the shaping surface 311 may be cured by sintering.

The powder material of the metal material or the ceramic material charged into the material supply unit 20 as the material MR may be a mixed material obtained by mixing a plurality of types of powder including single metal powder, alloy powder, and ceramic material powder. The powder material of the metal material or the ceramic material may be coated with, for example, the thermoplastic resin shown above or another thermoplastic resin. In this case, the thermoplastic resin may be melted in the melting unit 30 to exhibit fluidity.

For example, the following solvents can be added to the powder material of the metal material or the ceramic material charged into the material supply unit 20 as the material MR. A solvent can be used alone or in combination of two or more types selected from the following.

Example of Solvent

Water, (poly)alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, tetraalkylammonium acetates, sulfoxide-based solvents such as dimethyl sulfoxide and diethyl sulfoxide, pyridine-based solvents such as pyridine, γ-picoline, and 2,6-lutidine, tetraalkylammonium acetates (such as tetrabutylammonium acetate), and ionic liquids such as butyl carbitol acetate In addition, for example, the following binders can be added to the powder material of the metal material or the ceramic material charged to the material supply unit 20 as the material MR.

Example of Binder

Figure 10:
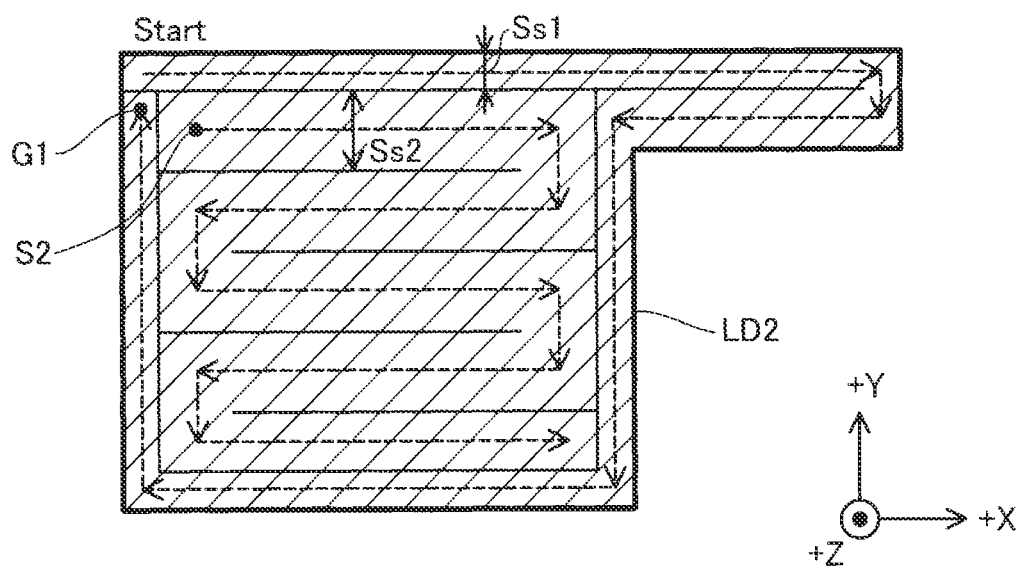
FIG. 10 is a diagram showing an example of a plane shape of one layer of the three-dimensional shaped object according to a second embodiment.

Acrylic resin, epoxy resin, silicone resin, cellulose-based resin or other synthetic resins or polylactic acid (PLA), polyamide (PA), polyphenylene sulfide (PPS), polyetheretherketone (PEEK) or other thermoplastic resins B. Second Embodiment FIG. 10 is a diagram showing an example of a plane shape of one layer of a three-dimensional shaped object according to a second embodiment. In FIG. 10, an example in which the contour line of the three-dimensional shaped object having a portion protruding outward is represented by layer data LD2 is indicated by the thick line. Since the configuration of the three-dimensional shaping device 100 of the second embodiment is similar as that of the first embodiment, a description thereof is omitted. Also in the second embodiment, the three-dimensional shaped object is shaped according to the method for manufacturing a three-dimensional shaped object shown in FIG. 5.

In the second embodiment, a first reference line width Ss1 in the first path is smaller than a second reference line width Ss2 in the second path. In the present embodiment, the first reference line width Ss1 is a value of 30% of the maximum line width Smax, and the second reference line width Ss2 is a value of 60% of the maximum line width Smax. The first reference line width Ss1 and the second reference line width Ss2 are different from the minimum line width Smin.

Also according to the method for manufacturing a three-dimensional shaped object of the second embodiment described above, it is possible to prevent the generation of the gap between the partial paths or between the partial path and the outer shell when generating the shaping data. In particular, in the present embodiment, since the first reference line width Ss1 is smaller than the second reference line width Ss2, the outer shell shape of the three-dimensional shaped object that is easily visible from the outside can be shaped accurately, and the inner side portion of the outer shell shape of the three-dimensional shaped object can be efficiently shaped.

C. Third Embodiment

Figure 11:
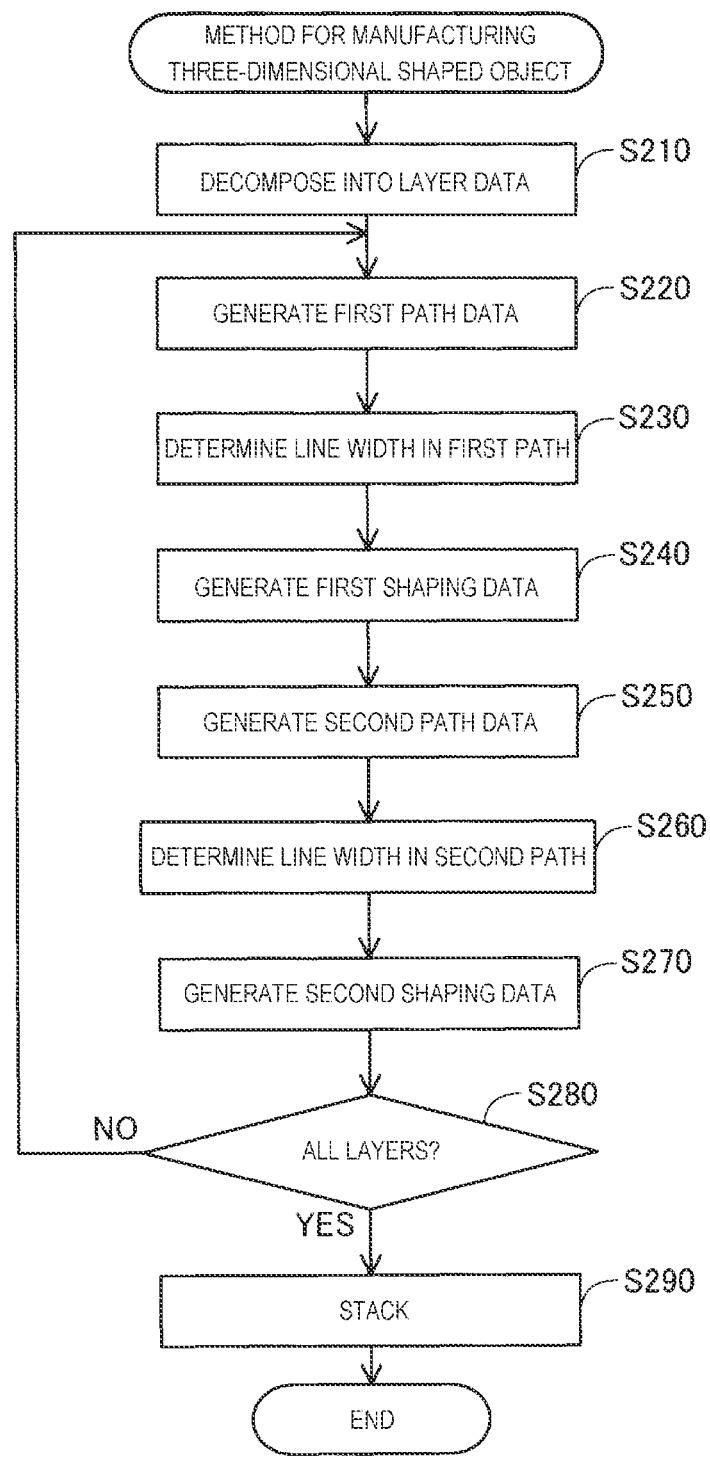
FIG. 11 is a process diagram showing a manufacturing process of the three-dimensional shaped object according to a third embodiment.
Figure 12:
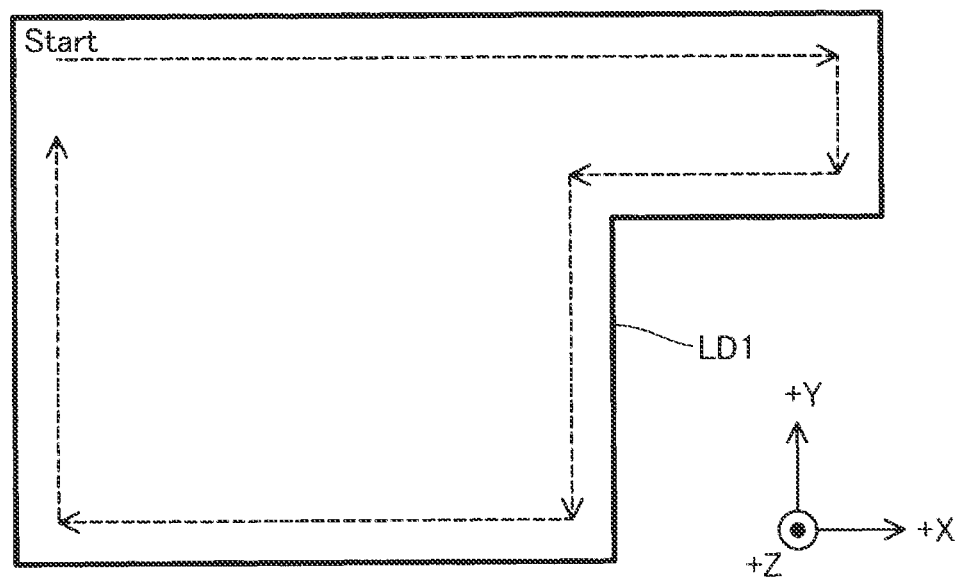
FIG. 12 is a diagram showing an example of a plane shape of one layer of the three-dimensional shaped object according to the third embodiment.
Figure 13:
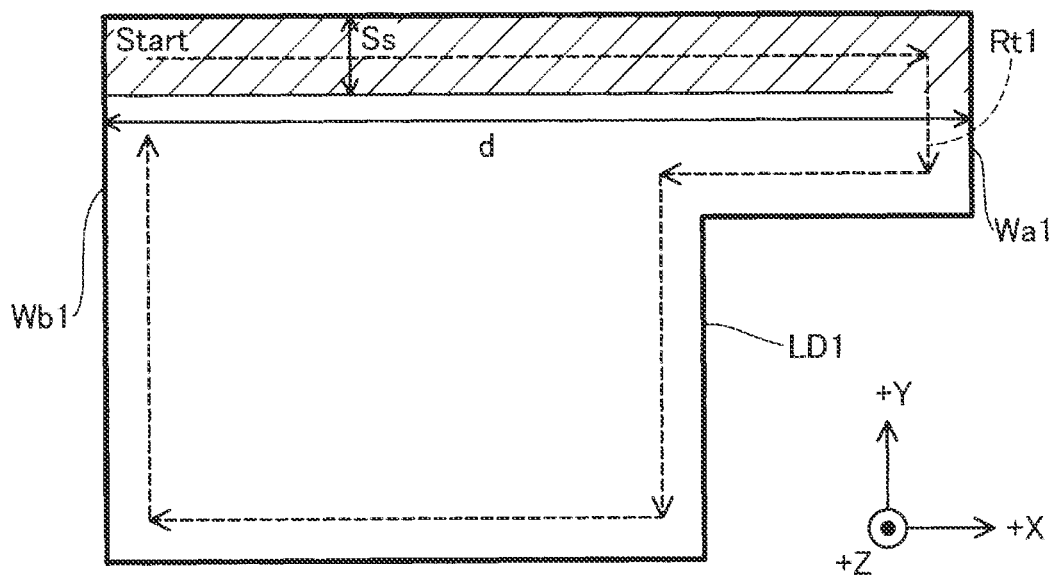
FIG. 13 is a diagram showing an example of a plane shape of one layer of the three-dimensional shaped object according to the third embodiment.

FIG. 11 is a process diagram showing a manufacturing process of a three-dimensional shaped object according to a third embodiment. FIGS. 12 and 13 are diagrams showing examples of a plane shape of one layer of the three-dimensional shaped object according to the third embodiment. In FIGS. 12 and 13, an example in which the contour line having a portion protruding outward is represented by the layer data LD1 is indicated by the thick line. The present embodiment is different from the first embodiment in that, after the path data is completed, the line width in each partial path included in the path data is determined. Specifically, the control unit 500 determines the line width in each first path after the first path data is completed, and determines the line width in each second path after the second path data is completed. Since the configuration of the three-dimensional shaping device 100 according to the third embodiment is similar to that of the first embodiment, a description thereof is omitted.

Since step S210 is similar as step S110 of the first embodiment shown in FIG. 5, and a description thereof is omitted.

In step S220, the control unit 500 generates the first path data. As shown in FIG. 12, in the present embodiment, the control unit 500 generates the first path data by generating all the first paths that form the outer shell shape before starting the determination of the line width in the first path. In step S220, the control unit 500 generates the first path data, for example, assuming that the shaping material having the reference line width is discharged from the discharge unit 60.

In step S230, the control unit 500 determines the line width in the first path. Specifically, the control unit 500 determines the line width in each first path included in the first path data generated in step S220. More specifically, the control unit 500 determines the line width in accordance with the distance d between the first wall and the second wall separated by the target path, using the first first path of the plurality of first paths as the target path. Next, the second first path is set as the target path, and the line width is determined similarly. FIG. 13 shows a state where, after the line width in the first first path is determined, the line width in the target path Rt1 is being determined with the second first path as the target path Rt1. By repeating the above processing until the line widths in all the first paths are determined, the line width in the first path is determined.

In step S240, the control unit 500 generates first shaping data including the first path data and the first line width information. In the present embodiment, in step S240, the control unit 500 determines the first line width information and generates the first shaping data. In another embodiment, the control unit 500 may generate the first line width information in each first path every time the line width in each first path is determined in step S230.

In step S250, the control unit 500 generates the second path data. That is, the control unit 500 generates the second path data by generating all the second paths that fill the infill region before starting the determination of the line width in the second path.

In step S260, the control unit 500 determines the line width in the second path. The control unit 500 determines the line width in the second path by executing similar processing as the processing executed for the first path in step S230 for the second path.

In step S270, the control unit 500 generates the second shaping data including the second path data and second discharge amount information. In the present embodiment, in step S270, the control unit 500 determines the second line width information and generates the second shaping data. In another embodiment, the control unit 500 may generate the second line width information in each second path every time the line width in each second path is determined in step S260.

In step S280, the control unit 500 determines whether the shaping data for all layers is completed. When the control unit 500 determines that the shaping data for all the layers is not completed, the processing returns to step S220 to generate the first path data in the next layer ML.

When it is determined in step S280 that the shaping data for all the layers is completed, in step S290, the control unit 500 shapes the three-dimensional shaped object according to the generated shaping data.

Also according to the method for manufacturing a three-dimensional shaped object of the second embodiment described above, it is possible to prevent the generation of the gap between the partial paths or between the partial path and the outer shell when generating the shaping data.

D. Other Embodiments (D-1) In the above embodiments, the line width information includes the discharge amount information or the moving speed information of the discharge unit 60. In contrast, the line width information may not include the discharge amount information and the moving speed information. For example, the line width information may be the line width itself in each partial path determined in the second step. In this case, the shaping data generated in the third step includes the path data and the line width, and does not include the discharge amount information and the moving speed information. In other cases, for example, the line width information may be a volume of the shaping material to be discharged.

(D-2) In the above embodiments, in the second step, when the Expression (1) is satisfied, the reference line width Ss is determined as the line width in the partial path, when the Expression (2) is satisfied, the line width in the partial path is determined to be larger than the reference line width Ss and equal to or less than the distance d, and when the Expression (3) is satisfied, the line width in the partial path is determined to be smaller than the reference line width Ss. In contrast, for example, only one of the above processing may be executed, or only two of the above processing may be executed. For example, when the Expression (1) and the Expression (2) are satisfied, the line width information may be determined as described above, and when the Expression (3) is satisfied, the line width information may be determined such that the line width is the reference line width Ss.

(D-3) In the above embodiments, the partial path is changed, based on the line width determined in accordance with the distance d, so as to pass through the center of the shaping material discharged from the discharge unit 60 in the partial path. In contrast, the partial path may not be changed based on the line width determined in accordance with the distance d. That is, the partial path may not pass through the center of the shaping material discharged from the discharge unit 60.

(D-4) In the above embodiments, the reference line width Ss is set to 30% or more and 60% or less of the maximum line width Smax. In contrast, the reference line width Ss may be a value less than 30% of the maximum line width Smax, or may be a value larger than 60% of the maximum line width Smax. The maximum line width Smax may be set as the reference line width Ss. In this case, for example, in the second step, when the Expression (1) is satisfied, the line width information can be determined such that the line width is the reference line width Ss, and when the Expression (3) is satisfied, the line width information can be determined such that the line width is smaller than the reference line width Ss.

(D-5) In the above embodiments, the reference line width Ss is a value larger than the minimum line width Smin. In contrast, the minimum line width Smin may be set to the reference line width Ss. In this case, for example, in the second step, when the Expression (1) is satisfied, the line width information can be determined such that the line width is the reference line width Ss, and when the Expression (2) is satisfied, the line width information can be determined such that the line width is larger than the reference line width Ss and equal to or less than the distance d.

(D-6) In the above embodiments, the first shaping data that forms the outer shell shape of the three-dimensional shaped object is generated, and after the first shaping data is generated, the second shaping data that fills the infill region is generated. In contrast, for example, the first shaping data and the second shaping data may not be separated. A plurality of shaping data for filling the infill region may be generated. For example, the second shaping data may be generated as data for forming a portion in contact with an inside of a portion to be shaped according to the first shaping data, and third shaping data may be generated as data for forming an inner side portion of the portion to be shaped according to the second shaping data.

(D-7) In the above embodiments, in the first step, the first path data and the second path data are generated by causing the first path and the second path to be continuous. In contrast, the first path and the second path may not be continuous.

E. Other Aspects

The present disclosure is not limited to the embodiments described above, and can be implemented in various forms without departing from the scope of the present disclosure. For example, the present disclosure can be implemented in the following aspects. In order to solve some or all of problems of the present disclosure, or to achieve some or all of effects of the present disclosure, technical characteristics in the above-described embodiments corresponding to technical characteristics in aspects described below can be replaced or combined as appropriate. If the technical characteristics are not described as essential in the present description, they can be deleted as appropriate.

(1) According to a first aspect of the present disclosure, a method for manufacturing a three-dimensional shaped object is provided in which a three-dimensional shaped object is manufactured by discharging a shaping material from a discharge unit toward a stage to stack a layer. The method for manufacturing a three-dimensional shaped object includes: a first step of generating path data having a plurality of partial paths each representing a path through which the discharge unit moves while discharging the shaping material; a second step of determining a line width of the shaping material in each of the partial paths and generating line width information for implementing the line width; a third step of generating shaping data having the path data and the line width information; and a fourth step of shaping the three-dimensional shaped object according to the shaping data. In the second step, the line width in a target path that is one of the partial paths is determined in accordance with a distance between a first wall and a second wall separated by the target path. The first wall and the second wall are side edges of the shaping material discharged in the partial path generated before the target path or a contour line of the three-dimensional shaped object.

According to such an aspect, it is possible to prevent the generation of the gap between the partial paths or between the partial path and the outer shell when generating the shaping data.

(2) In the method for manufacturing a three-dimensional shaped object according to the above aspect, the line width information may include discharge amount information indicating a discharge amount of the shaping material in each of the partial paths, or moving speed information indicating a moving speed of the discharge unit in each of the partial paths. According to such an aspect, by controlling the discharge amount and the moving speed of the discharge unit in each of the partial paths in accordance with the line width information, the shaping material having the line width determined in the second step can be discharged in each of the partial paths.

(3) In the method for manufacturing a three-dimensional shaped object according to the above aspect, in the second step, when the following Expression (1) is satisfied where the distance is d, a reference line width of the shaping material discharged from the discharge unit is Ss, and a minimum line width thereof is Smin, the reference line width Ss may be determined as the line width in the partial path, $$d > Ss + Smin \quad (1).$$

According to such an aspect, the line width is determined so as to leave a space having a width equal to or larger than the minimum line width. Accordingly, since the partial path for filling a remaining blank can be generated later, it is possible to prevent the generation of the gap when generating the shaping data.

(4) In the method for manufacturing a three-dimensional shaped object according to the above aspect, in the second step, when the following Expression (2) is satisfied where the distance is d, a reference line width of the shaping material discharged from the discharge unit is Ss, and a minimum line width thereof is Smin, the line width in the partial path may be determined to be larger than the reference line width Ss and equal to or less than the distance d, $$Ss < d \le Ss + Smin \quad (2).$$

According to such an aspect, it is possible to prevent the generation of the gap when generating the shaping data.

(5) In the method for manufacturing a three-dimensional shaped object according to the above aspect, in the second step, when the above Expression (2) is satisfied, the line width in the partial path may be determined to be equal to the distance d. According to such an aspect, since the shaping material is discharged so as to be in contact with the first wall and the second wall in the partial path, it is possible to more effectively prevent the generation of the gap when generating the shaping data.

(6) In the method for manufacturing a three-dimensional shaped object according to the above aspect, in the second step, when the following Expression (3) is satisfied where the distance is d, a reference line width of the shaping material discharged from the discharge unit is Ss, and a minimum line width thereof is Smin, the line width in the partial path may be determined to be smaller than the reference line width Ss, $$Smin < d \le Ss \quad (3).$$

According to such an aspect, it is possible to prevent the shaping material discharged in the partial path from overlapping the first wall and the second wall while preventing the generation of the gap when generating the shaping data.

(7) In the method for manufacturing a three-dimensional shaped object according to the above aspect, in the second step, when the above Expression (3) is satisfied, the line width in the partial path may be determined to be equal to the distance d. According to such an aspect, since the shaping material is discharged so as to be in contact with the first wall and the second wall in the partial path, it is possible to more effectively prevent the generation of the gap when generating the shaping data.

(8) In the method for manufacturing a three-dimensional shaped object according to the above aspect, the partial path may be changed, based on the determined line width, so as to pass through a center of the shaping material discharged from the discharge unit in the partial path. According to such an aspect, it is possible to prevent the generation of the gap in actual shaping with a simple configuration.

(9) In the method for manufacturing a three-dimensional shaped object according to the above aspect, a reference line width of the shaping material discharged from the discharge unit may be 30% or more and 60% or less of a maximum line width of the shaping material discharged from the discharge unit. According to such an aspect, a balance between shaping accuracy and shaping time can be maintained, and the three-dimensional shaped object can be shaped efficiently and accurately.

(10) In the method for manufacturing a three-dimensional shaped object according to the above aspect, the first step may include generating first path data having a plurality of first paths representing the partial paths that form an outer shell shape of the three-dimensional shaped object, and generating, after generating the first path data, second path data including a plurality of second paths representing the partial paths that fill an infill region that is an inner side portion of the outer shell shape; in the second step, the line width in each of the first paths is determined and first line width information in the first path is generated, and then the line width in a second path may be determined and second line width information in the second path may be generated; and in the third step, first shaping data including the first path data and the first line width information is generated, and the second shaping data including the second path data and the second line width information may be generated. According to such an aspect, the first shaping data for forming the outer shell shape that is easily visible from the outside is generated before the second shaping data. Therefore, it is possible to improve the shaping accuracy of the outer shell shape of the three-dimensional shaped object with simple control.

(11) In the method for manufacturing a three-dimensional shaped object according to the above aspect, in the first step, the first path data and the second path data may be generated by causing the first path and the second path to be continuous. According to such an aspect, the three-dimensional shaped object can be efficiently shaped.

(12) In the method for manufacturing a three-dimensional shaped object according to the above aspect, a reference line width of the shaping material discharged from the discharge unit in the first path may be smaller than the reference line width of the shaping material in the second path. According to such an aspect, it is possible to accurately shape the outer shell shape of the three-dimensional shaped object that is easily visible from the outside, and efficiently shape the inner side portion of the outer shell shape of the three-dimensional shaped object.

The present disclosure is not limited to the method for manufacturing a three-dimensional shaped object described above, but may be implemented in various aspects. For example, the present disclosure can be implemented in forms of a data processing device for processing data for shaping a three-dimensional shaped object, a three-dimensional shaping device, a method for controlling a three-dimensional shaping device, a computer program for shaping a three-dimensional shaped object, and a non-transitory tangible recording medium for recording a computer program.

What is claimed is:
1. A method for manufacturing a three-dimensional shaped object in which a three-dimensional shaped object is manufactured by discharging a shaping material from a nozzle of a discharge unit toward a stage to stack a layer, the method for manufacturing a three-dimensional shaped object comprising:
  generating path data having a plurality of partial paths each representing a path through which the discharge unit including the nozzle moves while discharging the shaping material;
  determining a line width of the shaping material in each of the partial paths and generating line width information for implementing the line width;
  generating shaping data including the path data and the line width information; and
  shaping the three-dimensional shaped object according to the shaping data,
  in the determining of the line width of the shaping material, the line width in a target path that is one of the partial paths being determined in accordance with a distance between a first wall and a second wall in an intersecting direction that intersects with an extending direction of the target path, with the target path extending between the first wall and the second wall in the extending direction, each of the first wall and the second wall being a contour line of the three-dimensional shaped object or a side edge of the shaping material discharged in a precedent partial path, the precedent partial path being a different one of the partial paths, which is different from the target path and is generated before the target path,
  the generating of the path data including generating first path data having a plurality of first paths representing the partial paths that form an outer shell shape of the three-dimensional shaped object, and generating, after generating the first path data, second path data having a plurality of second paths representing the partial paths that fill an infill region that is an inner side portion of the outer shell shape,
  in the determining of the line width of the shaping material, the line width in each of the first paths being determined and first line width information in each of the first paths being generated, and then the line width in each of the second paths being determined and second line width information in each of the second paths being generated, and
  in the generating of the shaping data, first shaping data that include the first path data and the first line width information being generated, and then second shaping data that include the second path data and the second line width information being generated, and
  a reference line width of the shaping material discharged from the nozzle of the discharge unit in the first path being smaller than the reference line width of the shaping material in the second path.

2. The method for manufacturing a three-dimensional shaped object according to claim 1, wherein
  the first line width information includes discharge amount information indicating a discharge amount of the shaping material in each of the first paths, or moving speed information indicating a moving speed of the discharge unit in each of the first paths, and
  the second line width information includes discharge amount information indicating a discharge amount of the shaping material in each of the second paths, or moving speed information indicating a moving speed of the discharge unit in each of the second paths.

3. The method for manufacturing a three-dimensional shaped object according to claim 1, wherein
  in the determining of the line width of the shaping material, when the following Expression (1) is satisfied where the distance is d, the reference line width is Ss, and a minimum line width thereof is Smin, the reference line width Ss is determined as the line width in the target path $$d > Ss + Smin \tag{1}$$

4. The method for manufacturing a three-dimensional shaped object according to claim 1, wherein
  in the determining of the line width of the shaping material, when the following Expression (2) is satisfied where the distance is d, the reference line width is Ss, and a minimum line width thereof is Smin, the line width in the target path is determined to be larger than the reference line width Ss and equal to or less than the distance d, $$Ss < d \leq Ss + Smin \tag{2}$$

5. The method for manufacturing a three-dimensional shaped object according to claim 4, wherein
  in the determining of the line width of the shaping material, when the above Expression (2) is satisfied, the line width in the target path is determined to be equal to the distance d.

6. The method for manufacturing a three-dimensional shaped object according to claim 1, wherein
  in the determining of the line width of the shaping material, when the following Expression (3) is satisfied where the distance is d, the reference line width is Ss, and a minimum line width thereof is Smin, the line width in the target path is determined to be smaller than the reference line width Ss, $$Smin < d \leq Ss \tag{3}$$

7. The method for manufacturing a three-dimensional shaped object according to claim 6, wherein
  in the determining of the line width of the shaping material, when the above Expression (3) is satisfied, the line width in the target path is determined to be equal to the distance d.

8. The method for manufacturing a three-dimensional shaped object according to claim 1, wherein
  the target path is changed, based on the determined line width, so as to pass through a center of the shaping material discharged from the nozzle of the discharge unit in the target path.

9. The method for manufacturing a three-dimensional shaped object according to claim 1, wherein
  the reference line width is 30% or more and 60% or less of a maximum line width of the shaping material discharged from the nozzle of the discharge unit.

10. The method for manufacturing a three-dimensional shaped object according to claim 1, wherein
  in generating of the path data, the first path data and the second path data are generated by causing the first path and the second path to be continuous.

* * * * *